Figure 1:
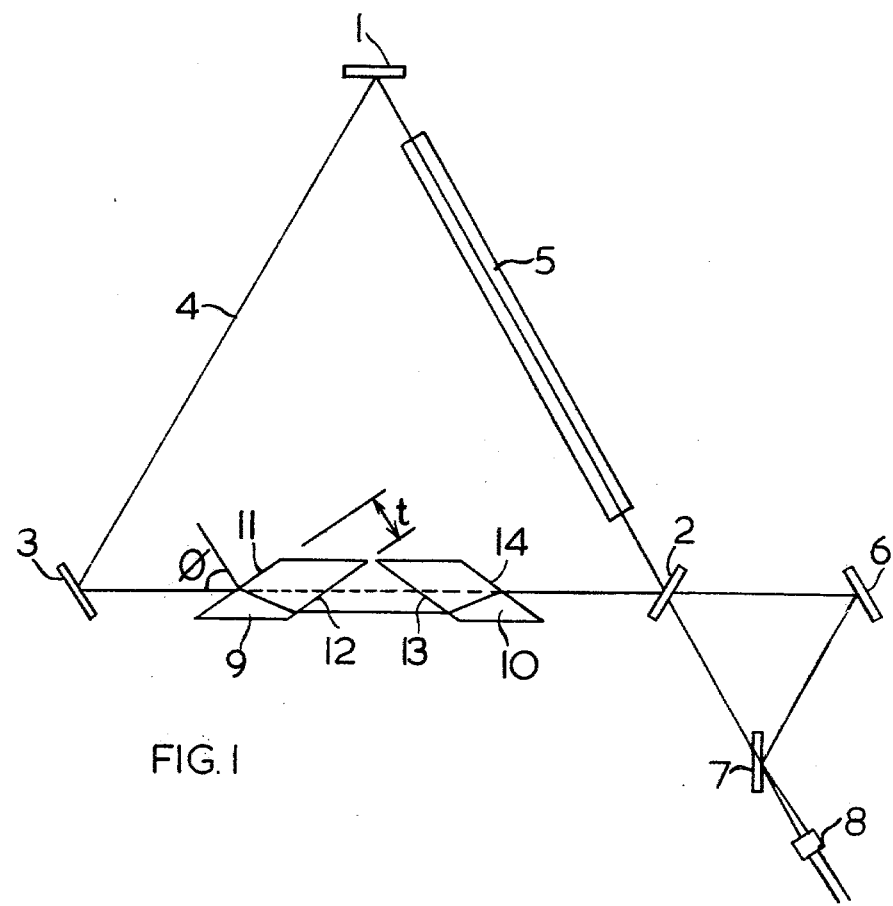

United States Patent [19]

Lindop

[11] 4,247,831
[45] Jan. 27, 1981

[54] RING LASERS

[75] Inventor: Anthony J. Lindop, Farnborough, England

[73] Assignee: The Secretary of State for Defence in Her Britannic Majesty's Government of the United Kingdom of Great Britain and Northern Ireland, London, England

[21] Appl. No.: 964,394

[22] Filed: Nov. 29, 1978

[30] Foreign Application Priority Data

Dec. 12, 1978 [GB] United Kingdom ............... 49891/77

[51] Int. Cl.³ ............................................. H01S 3/083
[52] U.S. Cl. ................................ 331/94.5 C; 356/350
[58] Field of Search ..................... 331/94.5 C, 94.5 D; 356/350

[56] References Cited

U.S. PATENT DOCUMENTS 3,791,738  2/1974  Newburgh ........................... 356/350
4,152,071  5/1979  Podgorski ........................... 356/350

Primary Examiner—William L. Sikes
Attorney, Agent, or Firm—Pollock, Vande Sande and Priddy

[57] ABSTRACT

The invention provides a ring laser having one or more parallel-sided prisms, or other refracting device, positioned in the light path of the laser resonant cavity formed by, for example, three mirrors, and including a solenoid or other means for imparting oscillatory translational motion to the prism or prisms or refracting device with a component parallel to the portion of the light path which passes therethrough.

4 Claims, 2 Drawing Figures

RING LASERS

This invention relates to ring lasers and more particularly to means for reducing the effect of lock-in in ring lasers.

The possibility of using ring lasers instead of inertial gyroscopes to measure angular velocity (so-called 'ring-laser gyroscopes') particularly in self-contained navigation systems, has been known for some time, but a serious problem to begin with was that of lock-in. In a ring laser an optical cavity is arranged to constrain a light beam to follow a closed path enclosed by some usually planar areas. A gain medium is disposed in the path of the light beam to amplify the light by stimulated emission in a similar manner to other lasers. The light beam can traverse the closed path in two senses (clockwise and anti-clockwise) so there are two modes of resonance, assuming that there is only one polarization mode, a clockwise mode and an aniticlockwise mode. When the laser is at rest the distance travelled by the light beam in traversing the closed path in the clockwise sense is equal to the distance travelled in traversing the path in the anti-clockwise sense, so the frequencies of the two modes are equal. When the laser rotates in the plane of the light path (that is to say about an axis at right-angles to the plane of the light path) the distance travelled in traversing the path in the two senses are not exactly equal, so one would expect that the frequencies of the modes would be different. In practice there is some coupling between the modes, probably due to imperfections in the mirrors used to form the resonant cavity, and below a critical angular velocity the modes have the same frequency; they are said to be locked in. Above a critical angular velocity the modes behave much as they are expected to. One can extract some-light from each of the modes and form interference fringes. When the frequencies of the modes differ the fringes move, and by counting the fringes an indication can be gained of the angle through which a laser has rotated, but because of the lock-in effect any rotation at less than the critical angular velocity is discounted.

A technique has been developed for reducing the effect of lock-in, known as 'dither'. In the dither technique an oscillatory angular velocity (for example a sinusoidally varying angle of velocity) is applied to the laser in addition to the angular velocity which is the subject of measurement. The amplitude of the periodically varying angular velocity is such that the instantaneous angular velocity is above the critical value for a high proportion of the time when the angular velocity which is the subject of measurement is within the range of interest. The dither technique has effectively removed lock-in as a serious obstacle to the use of ring-laser gyroscopes in self-contained navigation systems, but while it is undoubtedly effective it is cumbersome in that it involves applying the dithering motion to the whole laser or a substantial part of it.

According to the present invention there is provided a ring laser having a portion of refracting material in the light path of its resonant cavity and means for applying an oscillatory translational motion to the portion of refracting material with a component parallel to the portion of the light path which passes through it.

A refracting material is a transparent material with refractive index greater than unity.

Preferably the portion of refracting material comprises one or more parallel-sided prisms arranged with surfaces at an oblique angle to the the portion of the light path which intersects them. Preferably the surfaces of the prism or prisms are arranged so that the light path intersects them at Brewster's angle so as to reduce reflection by the surfaces. Alternatively the surfaces which the ligh path intersects may be coated with dielectric anti-reflecting coatings. Preferably there are two of the prisms arranged so that any lateral shift in the light path due to refraction by one of the prisms is complemented by equal and opposite lateral shift due to refraction by the other.

The avoidance of lock-in in this invention is achieved by using the phenomenon known as Fresnel Drag. In this effect the speed of light in a transparent medium with refractive index n is altered by physically moving the medium along the direction of the light beam. For a velocity V in the direction of the light beam the effect of V is approximately equivalent to a new refractive index m given by $$m = n(1 - nV\alpha/c)$$

where c is the speed of light in vacuc and $\alpha$ is the Fresnel Drag coefficient given approximately by $\alpha = 1 - n^{-2}$.

If the physical length of the portion of the light path passing through the medium is d the optical path length in the medium is m d. Thus light travelling in the same direction as the medium (V positive) experiences a shorter optical path than light travelling in opposite direction) (V negative) since the effetive refractive index m will be different in the two cases. The path difference 1 between the two beams due to Fresnel Drag is of magnitude $$1 = 2n^2 \, V\alpha d/c.$$

The maintenance of laser oscillation within any optical cavity requires that the phase of the electromagnetic waves, either the clockwise or the anti-clockwise beam in the present case, be reproduced exactly after one complete trip round the laser cavity. For a ring cavity this means that the optical perimeter of the ring L must be an integral number of whole wavelengths $\lambda$. This must apply to both the clockwise and anti-clockwise beams independently so if the effective value of L is changed by the moving medium as discussed above, then (setting aside the effect of lock-in for the time being) the wavelength $\lambda$ also changes and there is a corresponding difference F in frequency between the modes which is given by $$F = 2n^2 \alpha V d/\lambda L.$$

The frequency F constitutes an additive bias frequency. If the laser is also rotating with an angular velocity $\Omega$ in the plane of the light path there will also be a frequency difference f between the modes due to the rotation where f is given by $$f = 4A\Omega/\lambda L$$

(A being the area of the light path) and the total frequency difference between the modes (still setting aside the effect of lock-in) will be the sum F + f. The effect of lock-in is that when F + f is less than some critical value $f_0$ the modes will be locked in and the frequency difference will be zero. In the invention V varies in an oscillatory manner, so F also varies in an oscillatory manner. If the amplitude of the variation of F is large enough compared with $f_0$ the modes will only be locked in for a small fraction of the time, so any errors due to lock-in will be correspondingly small and susceptible to further reduction by calibration.

The behavior of a laser according to the invention is very similar to that of a laser subjected to dither, and output signals obtained from a laser according to the invention can be interpreted in an analogous way to signals obtained from a dithered laser. For example the movement of interference fringes formed from light from the two modes can be sampled over periods for which the average value of F is zero. Then since the net fringe movement over a period is proportional to the time integral of the frequency difference over that period and since the periods are such that the time integral of F is zero, the net fringe movement will be proportional to the time integral of f. Since F varies linearly with V the time integral of F over a period is proportional to the time integral of V over that period, or in other words to the net displacement of the refracting material over the period. A period over which the average value of F is zero is thus simply a period at the end of which the refracting material is at the same position, relative to the rest of the laser, as at the beginning.

It is known in connection with the dither technique to include a random contribution in the dither, so it is not exactly periodic. This has the effect of spreading out, and thereby reducing the adverse effect of, some singularities in the calibration curve of the laser. This randomizing technique can equally well be applied to the present invention by including a random contribution to the motion of the refracting medium.

Figure 2:
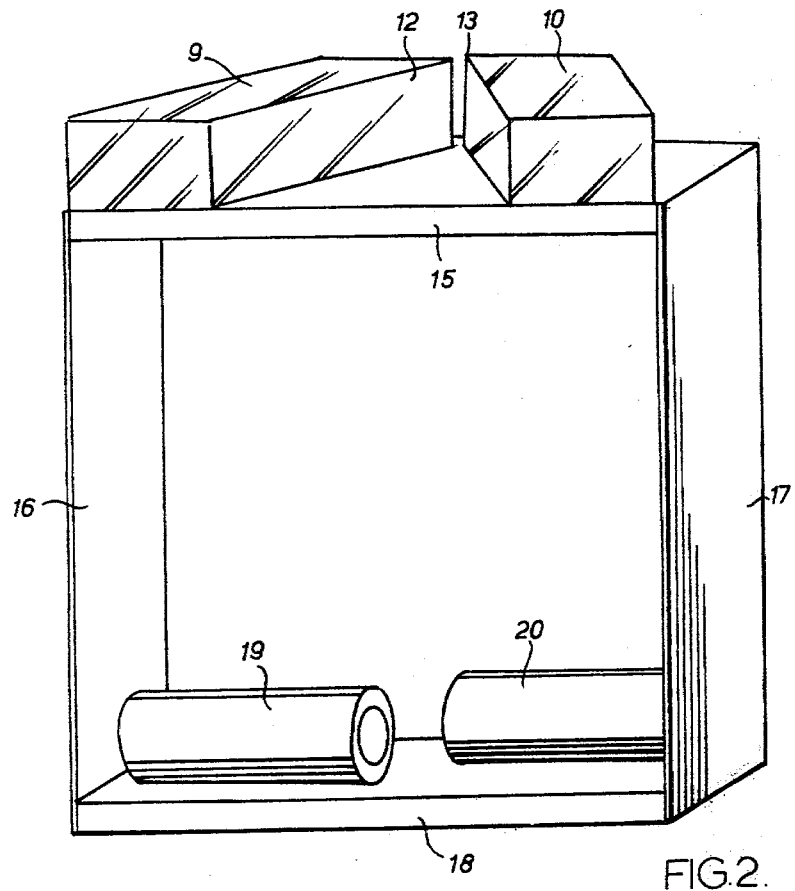

An embodiment of the invention will now be described by way of example with reference to the accompanying drawings of which:

FIG. 1 shows in schematic plan view a laser according to the invention, and FIG. 2 shows in more detail a part of the laser of FIG. 1.

In FIG. 1 is shown an optical cavity formed by three mirrors, 1, 2 and 3, aligned to define a light path 4. An amplifying medium 5 consisting of a helium-neon laser tube is arranged in the light path 4. The mirrors, 1, 2, and 3 and the amplifying medium 5, constitute a ring laser capable of supporting light modes traversing the optical path 4 in the clock-wise and the anti-clockwise sense. The mirror 2 is partially transmitting and transmits a small proportion of the light incident upon it from the two modes to a beam combiner, comprising a mirror 6 and a half-silvered mirror 7. The beam combines combiner light from the two modes to form a diffraction pattern which is detected by a pair of photodetectors 8, which are arranged at a distance apart of about a quarter of the spacing between adjacent fringes in the diffraction pattern. Information about the degree and direction of movement of fringes in the diffraction pattern can be obtained from outputs of the photodetectors 8 by electronic means (not shown) of a type known in connection with conventional ring lasers. The laser as described thus far is of a conventional type.

In the optical path 4 of the laser a pair of parallel-sided prisms 9 and 10 are arranged so that optical path 4 intersects surfaces 11, 12, 13 and 14 of the prisms 9 and 10 at Brewster's angle $\theta$. The prisms 9 and 10 are arranged so that the planes of incidence of the optical path 4 with the surfaces 11, 12, 13, and 14 coincide with the plane of the optical path 4. This arrangement is suitable for a laser in which the light is polarized with the electric vector in the plane of the optical path 4, (so-called P-polarization). In the case of so-called S-polarization, that is to say with the electrical vector of the light normal to the plane of the optical path 4, the prisms 9 and 10 would have to be oriented so that the planes of incidence of the optical path 4 with the surfaces 11, 12, 13 and 14 were perpendicular to the plane of the optical path 4. The prisms 9 and 10 are arranged in a symmetrical manner so that the lateral shift in the optical path 4 produced by the prism 9 is complemented by an equal and opposite lateral shift produced by the prism 10. Thus the mirrors 1, 2 and 3 can be aligned with the prisms 9 and 10 removed, in which case the optical path 4 will follow the unrefracted path indicated by a dotted line in the region of the prisms 9 and 10, and then the prisms 9 and 10 can be inserted without it being necessary to re-align the mirrors 1, 2 and 3. In the exemplary embodiment the prisms 9 and 10 are of fuzed silica with a refractive index $n = 1.45704$ and have a thickness $t = 10$ mm. The operating wavelength $\lambda$ of the laser is 632.8 nm.

The mounting of the prisms 9 and 10 is shown in more detail in FIG. 2. The two prisms 9 and 10 are clamped by means of a cover plate (not shown) to a supporting plate 15 which is supported by a pair of parallel plate springs, 16 and 17, one at each end of the supporting plate 15. The springs 16 and 17, which are of ferromagnetic material, are mounted one at each end of a baseplate 18, on which is mounted a pair of iron-cored coils 19 and 20 close to the springs 16 and 17 respectively. The coils 19 and 20 are alternately energized by means of a conventional electrical feed-back circuit (not shown) to cause the springs 16 and 17, and with them the supporting plate 15 and the prisms 9 and 10, to vibrate at a resonant frequency. In the exemplary embodiment the frequency of this vibration is about 35 Hz and the amplitude of the vibration of the prisms 9 and 10 is 3 mm giving a range of displacement of 6 mm.

A number of modifications of the embodiment described will be apparent to a person skilled in the art to which this invention relates. For example although a resonant cavity formed by three mirrors has been shown, ring lasers having cavities formed by four or more mirrors are known and the invention can be applied to these. The means for imparting the oscillatory motion to the prisms 9 and 10 could be, instead of the coils 19 and 20 acting directly on the springs 16 and 17, a piezoelectric or moving-coil transducer or other type of electric motion transducer.

I claim:

1. A ring laser having a resonant cavity, said laser including at least one parallel-sided isotropic light refracting device arranged with the parallel sides thereof at an oblique angle to a part of the light path which intersects said sides, and means for applying an oscillatory translational motion to said refracting device wherein the motion has a component parallel to said part of the light path.

2. A ring laser as in claim 1 wherein said light refracting device comprises two parallel-sided prisms arranged such that a lateral shift in the light path due to refraction by one of said prisms is complemented by an equal and opposite lateral shift due to refraction by the other prism.

3. A ring laser as in claim 1 wherein said light refracting device comprises a plurality of parallel-sided prisms, wherein said prisms are arranged so that the light path intersects the prisms at Brewster's angle thereby reducing reflection from the prisms.

4. A ring laser as in claims 2 or 3 wherein the parallel sides of said prisms are coated with dielectric anti-reflecting coatings.

* * * * *